United States Patent [19]

Linick

[11] 4,407,464
[45] Oct. 4, 1983

[54] STEERING MECHANISM FOR A THERMAL IMAGING SYSTEM AND RANGEFINDER THEREFOR

[76] Inventor: James Linick, 4611 San Miguel, Tampa, Fla. 33609

[21] Appl. No.: 286,767

[22] Filed: Jul. 27, 1981

[51] Int. Cl.³ .............................................. F41G 7/26
[52] U.S. Cl. .................................................. 244/3.13
[58] Field of Search ............................ 244/3.13, 3.16; 250/203 R

[56] References Cited

U.S. PATENT DOCUMENTS

| | | | |
|---|---|---|---|
| 3,235,733 | 2/1966 | Dauguet | 250/203 R |
| 3,296,443 | 1/1967 | Argyle | 250/203 R |
| 3,513,315 | 5/1970 | Sundstrom et al. | 250/203 R |
| 4,034,949 | 7/1977 | Hoesterey et al. | 244/3.16 |
| 4,038,547 | 7/1977 | Hoesterey | 244/3.11 |
| 4,111,384 | 9/1978 | Cooper | 244/3.13 |
| 4,326,799 | 4/1982 | Keene et al. | 244/3.16 |

FOREIGN PATENT DOCUMENTS 2033186  5/1980  United Kingdom ............... 244/3.13

*Primary Examiner*—Charles T. Jordan
*Attorney, Agent, or Firm*—Stefan Stein

[57] ABSTRACT

A steering mechanism is described for use in conjunction with a thermal imaging system. The steering mechanism comprises a pair of prisms which are positioned serially in front of the scanning mechanism of the thermal imaging system. The prisms are individually rotated by a motor means. A position encoder is connected to each of the prisms to provide feedback position information to a search computer which controls the rotation of the prisms. The refraction of the thermal image produced by the rotating prisms enables the scanning mechanism of the thermal imaging system to search in any searching pattern within a variable field of regard in the field of search of the steering mechanism. The steering mechanism may also function to boresight a laser on the same target viewed by the thermal imaging system. In one embodiment, the laser comprises a pulsed-type laser whose pulsed laser beam is transmitted through the prisms onto an acquired target. The reflection of the pulsed laser beam is then reflected from the acquired target and detected by the thermal imaging system. The lapse of time between transmission and detection of the pulsed laser beam enables the computer to compute the range of the target. The laser may alternatively comprise a low power continuous output laser which may function as a laser designator for beam rider devices.

9 Claims, 3 Drawing Figures

STEERING MECHANISM FOR A THERMAL IMAGING SYSTEM AND RANGEFINDER THEREFOR

BACKGROUND OF THE INVENTION

1. Field of the Invention

This invention relates to opto-mechanical steering devices for thermal imaging systems which project the field of view of the scanner mechanism of the thermal imaging system over a wide field of search.

2. Description of the Prior Art

Presently there exists many thermal imaging systems designed to convert infrared radiation to visible radiation for viewing by an observer. The most common types of these thermal imaging systems are single framing thermographic cameras, downward looking single channel thermal mapping systems, and fast framing thermal imaging systems.

Fast framing thermal imaging systems comprise mechanically-scanning devices which convert radiation in the far infrared spectral region to visible radiation in real time and at an information rate (or frame rate) comparable to that of standard television. Such systems are commonly referred to as FLIR systems, the acronym for Forward Looking Infra-Red. Although the term FLIR originally implied an airborne system, it is now used to denote any fast framing thermal imager. Thermal imaging in a FLIR is produced by an optical system which collects, spectrally filters, and focuses the infrared scene radiation onto an optically scanned multi-element detector array. The elements of the detector array then convert the optical signals into analog electrical signals which are amplified and processed for display on a monitor such as a video monitor.

The function of the scanner mechanism in a FLIR is to move the image formed by the optical system in the plane of the detector array in such a way that the detectors disect the image sequentially and completely. The field of view of such scanning mechanisms are relatively narrow, usually from a few degrees to as much as ten degrees. Obviously, such narrow fields of view substantially inhibit the use of the FLIR in seeking out and locating various targets.

State-of-the-art steering devices designed to enable the FLIR to search a wide field of search typically comprise some type of a gimbal assembly, the axes of rotation of which are controlled by several stepping motors or the like. A joystick control is usually provided for controllably energizing the motors which in turn pivot the FLIR about the elevational and azimuthal axes of the gimbal assembly. More advanced steering devices have been developed which use computers to control the motors such that the FLIR automatically searches over prescribed fields of regards in preselected patterns.

The major disadvantage to these gimbal assemblies, more commonly referred to as platforms, is the fact that the entire FLIR must oscillate in the azimuthal and in the elevational directions in order to produce the desired search pattern. As is true with any oscillatory mechanism, a great amount of microphonics is produced which adversely affects the performance of the FLIR. Moreover, in order to produce just a single line scan the motor driving one axis of the platform must be capable of producing a high amount of torque sufficient to pivot the FLIR in one direction at a constant velocity, instantaneously decelerate the FLIR to a stop, and then instantaneously accelerate the FLIR to pivot the FLIR at a constant velocity in the opposite direction. Obviously, inasmuch as it is virtually impossible to instantaneously stop and start the movement of the FLIR, a uniform search rate cannot be achieved.

Another major disadvantage to steering mechanisms such as platforms is their inability to determine the exact position of the target. Typically, the direction cosines of the target may be computed by incorporating position detectors within the azimuthal and the elevational axes of the gimbal assembly of the platform. Unfortunately, there exists no device which may be used in conjunction with FLIRs to determine the distance to the target.

Therefore, it is an object of this invention to provide an apparatus and method which overcomes the aforementioned inadequacies of the prior art devices and provides an improvement which is a significant contribution to the advancement of the thermal imaging art.

Another object of this invention is to provide a steering mechanism for a thermal imaging system such as a FLIR which enables a FLIR to search over a wide field of search.

Another object of this invention is to provide a steering mechanism which obviates the need for platforms in which the entire thermal imaging system oscillates about the azimuthal and the elevational axes of the platforms.

Another object of this invention is to provide a steering mechanism which utilizes a pair of prisms which are individually controlled to produce preselected search patterns at any rate of scan within variable fields of regard over a wide field of search.

Another object of this invention is to provide a steering mechanism for a thermal imaging system including means for boresighting a rangefinder on the target viewed by the thermal imaging system.

Another object of this invention is to provide a steering mechanism for a thermal imaging system including means for boresighting a laser designator on the target viewed by the thermal imaging system for beam rider purposes.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an optical steering mechanism which may be incorporated within a fast framing thermal imaging system such as a FLIR. More particularly, the optical steering mechanism of the subject invention comprises two prisms which are canted with respect to the axis of the FLIR and positioned in front of the scanning mechanism of the FLIR. The two prisms are individually rotated to cause refraction of the radiation from the thermal image prior to being supplied to the scanning mechanism of the FLIR. The angular velocity of each of the prisms is independently and precisely controlled by a search computer. A position encoder is connected to each of the prisms to feedback position information to the search computer thereby providing a closed-loop control system.

The steering mechanism of the invention operates to scan the FLIR within a wide field of search. More particularly, the search computer controls the relative angular position of the prisms with respect to one another, and the angular velocity of each of the prisms to automatically produce any searching pattern within a variable field of regard in the field of search. A joystick device may be interfaced to the search computer to manually control a reticle for target acquisition, the angular position of which is computed by the search computer in terms of direction cosines for display to the operator. Additionally, a keyboard entry device may be interfaced to the search computer enabling the operator to manually input into the search computer fixed search angle parameters such as the elevational angle of search, azimuthal angle of search, total angle of search, and the rate of search.

The steering mechanism of the subject invention may also function to boresight a laser on the same target viewed by the FLIR. Specifically, a laser may be positioned parallel to the axis of the field of view of the FLIR such that the transmitted beam from the laser is transmitted through the outer edge of the prisms of the steering mechanism. Since the laser beam passes through the same steering optics, the transmitted beam will always be boresighted to the FLIR at any and all search angles. In one embodiment the laser comprises a pulsed-type laser which may function as a rangefinder by pulsing the output of the laser, detecting the reflection of the pulsed laser beam from the acquired target by means of the detector array of the FLIR, and determining the elapsed time between transmission and detection to compute the range of the target. In another embodiment, the laser comprises a relatively low power continuous output laser which would function as a laser designator for beam rider devices.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawing.

DETAILED DESCRIPTION

Figure 1:
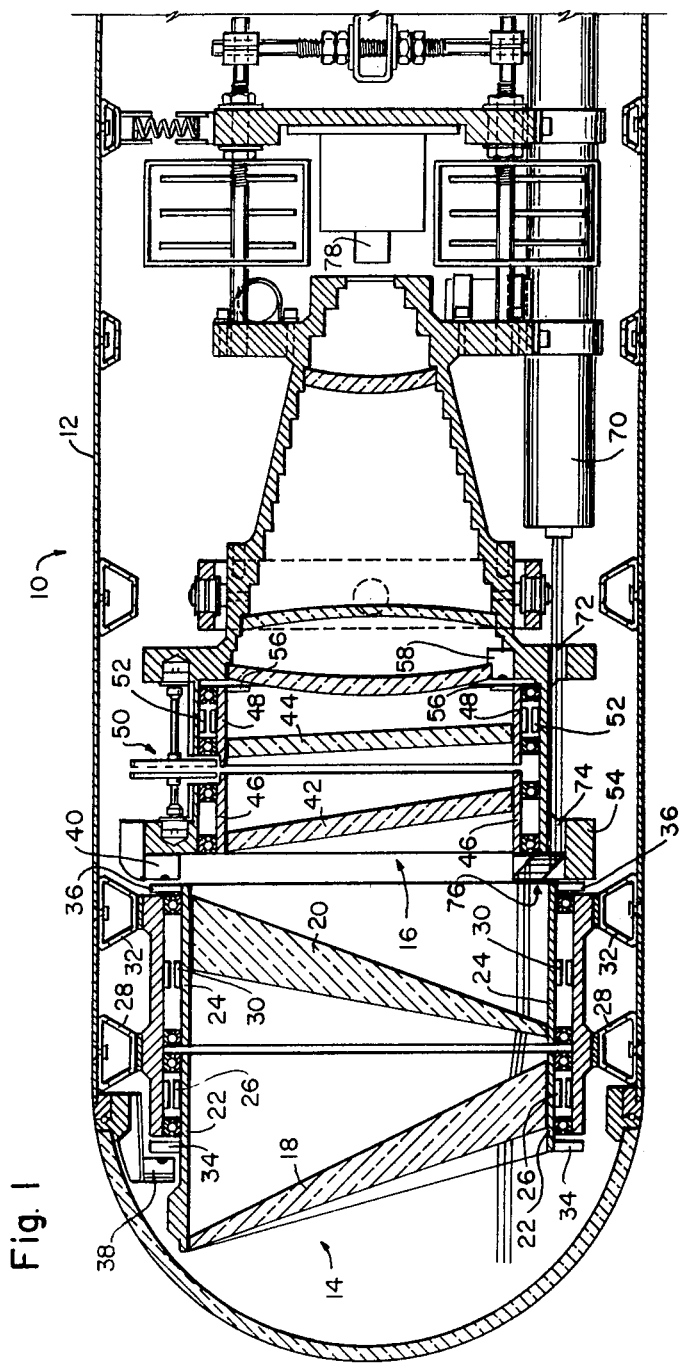
FIG. 1 is a cross-sectional view of a thermal imaging system installed within a pod and having the steering mechanism of the invention incorporated therein.

FIG. 1 is a cross-sectional view of a thermal imaging system 10 installed within a pod 12 and having the steering mechanism 14 of the invention incorporated therein. It shall be noted that the thermal imaging system 10 may comprise any type of thermal imager such as single framing thermographic cameras, downward looking single channel thermal mapping systems, or fast framing thermal imaging systems. For purposes of illustration, the steering mechanism 14 will be described as being used in conjunction with a fast framing thermal imaging system, commonly referred to as a FLIR.

The steering mechanism 14 of the invention basically comprises a first and a second prism 18 and 20 which are serially positioned in front of the scanning mechanism 16 of the FLIR 10. Each of the prisms 18 and 20 are individually rotatably disposed within the pod 12. The prisms 18 and 20 function to refract the parallel radiation from the thermal image being supplied to the scanning mechanism 16 of the FLIR 10. The refraction produced by the rotating prisms 18 and 20 enable the scanning mechanism 16 to search over an extremely wide field of search. As a result, the steering mechanism 14 is operable in conjunction with virtually any type of scanning mechanism 16. Preferably, however, the steering mechanism 14 of the invention is used in conjunction with my novel scanning mechanism described in detail in my co-pending application Ser. No. 286,768, filed July 27, 1981, which is hereby incorporated by reference into the subject application.

More particularly, the first and second prisms 18 and 20 are rigidly secured with respective retaining rings 22 and 24. A first motor 26, such as a biphase torque motor, is built within the pod 12 between the first retaining ring 22 and a support 28 extending from within the pod 12. Likewise, a second motor 28, such as a biphase torque motor, is built within the pod to interconnect the second retaining ring 24 to another support 32. Each of the motors 26 and 30 function to rotate the respective prisms 18 and 20 within the pod 12. A first and second timing disc 34 and 36 are respectively connected about the first and second retaining rings 22 and 24. A first and second optical encoder 38 and 40 is connected to the pod and positioned to read the relative rotational position of the respective timing discs 34 and 36.

As noted earlier, the steering mechanism 14 of the invention is preferably used in conjunction with my scanning mechanism 16 described in my co-pending application filed concurrently herewith. Briefly summarizing, the scanning mechanism 16 of my concurrent application comprises a first and second prism 42 and 44 which are respectively secured within first and second retaining rings 46 and 48. A counterrotating mechanism 50 interconnects the first and second retaining rings 46 and 48 such that rotation of one of the retaining rings in one direction will cause the other retaining ring to rotate in the opposite direction at the same angular velocity. Instead of utilizing a drive motor and drive train assembly, the scanning mechanism 16 has been modified to include a motor 52 which interconnects the second retaining ring 48 to a support 54 extending from within the pod 12. Preferably, motor 52 comprises a built-in motor such as a biphase motor. A timing disc 56 is positioned about the second retaining ring 48 and is read by an optical encoder 58 to provide rotational position information of the prisms 42 and 44.

As noted earlier, the prisms 18 and 20 of the steering mechanism 14 of the invention operate to refract the incoming rays onto the scanning mechanism 16 of the thermal imaging system 10. The following equations describe this refraction produced by the prisms 18 and 20.

Figure 2:
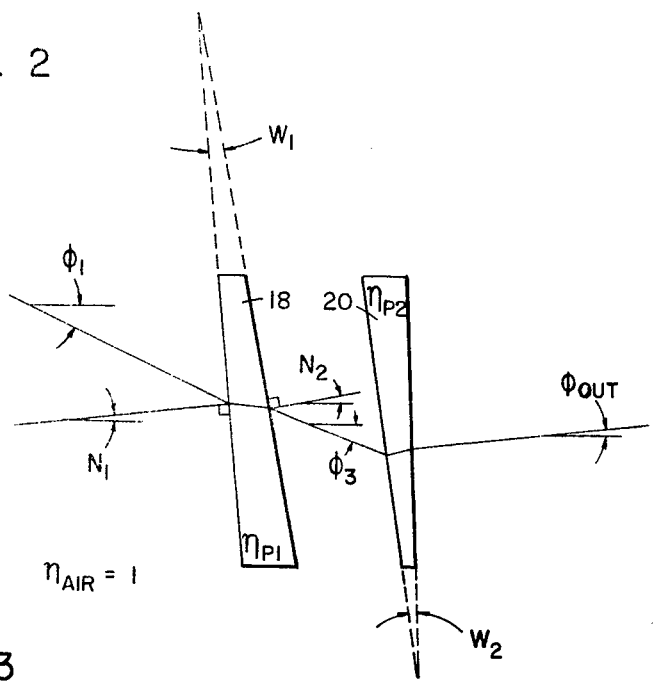
FIG. 2 is a diametric view of the prisms of the steering mechanism of the invention showing the refraction of the infrared radiation therethrough.

Referring to FIG. 2, the refraction through a single prism can be represented by:

$$\phi_3 = \arcsin[\eta_{p1} \sin[\arcsin[1/\eta_{p1} \sin[\phi_1 - N_1]] - W_1]] + N_2$$

where:
W is the wedge angle of the prism and
$\eta$ is the index of refraction of the prism. For a scaner, let $\phi_1$ go to 0.0 (on axis scan), then $$\phi_3 = \arcsin[\eta_{p1} \sin[\arcsin[1/\eta_{p1} \sin[-N_1]] - N_1]] + N_2$$

With two prisms in series, $\phi_3$ from the first prism 18 becomes $\phi_1$ for the second prism 20 and $N_3$ and $N_4$ become the first and the second surface normals, respectively, of the second prism 20. Thus:

$$\phi_{out} = \arcsin[\eta_{p1} \sin[\arcsin[1/\eta_{72\,p2} \sin[\phi_3 - N_3]] - W_2]] + N_4$$

where $\phi_3 = \arcsin[\eta_{p1} \sin[\arcsin[1/\eta_{p1} \sin[-N_1]] - W_1]] + N_2$ Examination of the above equation for $\phi_{out}$ reveals that as the prisms counterrotate out of their initial positions, the normals and the wedges taken an X and Y component resulting in the output ray developing an X and Y component. It is this $\phi_x$ and $\phi_y$ which produces the scan. From the above equations, it should be appreciated that the angle of tilt, index of refraction and the wedge angle of each of the prisms 18 and 20 may be selected to produce any search pattern of the object space by varying the rotational position of the prisms 18 and 20 with respect to one another.

Figure 3:
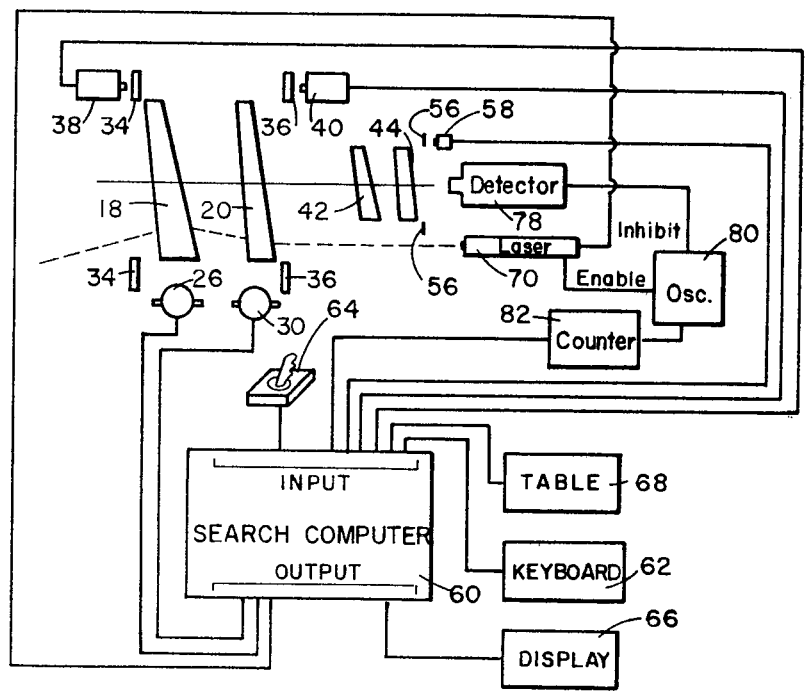
FIG. 3 is a block diagram illustrating the manner in which a computer may be utilized to control the steering mechanism of the invention to search any searching pattern in object space.

FIG. 3 is a block diagram illustrating the manner in which a computer 60 may be utilized to produce any scan pattern of the object space. Specifically, the output of the optical encoders 38 and 40 is connected to an input port of the search computer 60. Each of the motors 26 and 30 driving the prisms 18 and 20 are then connected to an output port of the search computer. A keyboard input device 62 and a joystick device 64 are similarly connected to an input port of the search computer 60. The keyboard entry device 62 allows an operator to manually input into the search computer 60 any fixed search angle parameters such as the elevational angle of search, azimuthal angle of search, total angle of search and the rate of search. The joystick device 64 allows the operator to manually control a recticle for target acquisition. Once the target is acquired, the search computer 60 receives feedback information from the optical encoders 38 and 40 to verify the rotation position of the prisms 18 and 20 and to determine the direction cosines of the acquired target which are then displayed to the operator by a suitable display 66.

It is noted that the search computer 60 operates to keep track of the positions of the prisms 18 and 20 and the requested search angles. A lookup table 68 is interfaced to an input port of the computer 60 which enables the computer 60 to convert a requested search angle into the required prism positions. Upon obtaining the required prism positions, the computer controls motors 26 and 30 to rotate the prisms 18 and 20 to the required position. The output of the optical encoders 38 and 40 is continuously fed back to the search computer 60 such that the search computer 60 may accurately verify the rotational position of each of the prisms 18 and 20. Any search pattern at any search rate and within any field of regard may therefore be accomplished through the use of the computer 60.

Returning to FIG. 1, the steering mechanism 14 further comprises a laser 70 positioned parallel to the axis of the steering mechanism 14. The output of the laser 70 is transmitted through apertures 72 and 74 in the support 54 of the scanning mechanism 16. The output of the laser 70 is then redirected by a mirror assembly 76 to a direction substantially parallel to the axis of the steering mechanism 14 such that the output beam of the laser 70 is transmitted through the outer portions of each of the prisms 18 and 20. Since the laser beam is transmitted through the steering mechanism 14 of the invention, the laser beam will always be boresighted with the scanning mechanism 16. Of course, the output beam of the laser 70 must be at a spectral wavelength compatible with the prisms 18 and 20 and with the imaging system, the purpose of which is discussed below.

In one embodiment, the laser 70 may comprise a pulse-type laser which produces short pulses for transmission through the steering mechanism 14. This enables the laser 70 to function as a rangefinder. Specifically, when a target is acquired, the laser 70 is pulsed. The pulsed beam from the laser 70 is transmitted through the steering mechanism 14 to the acquired target. The reflection of the pulsed beam is then received through the steering mechanism 14 and is detected by the detector array 78 of the thermal imaging system 10. The laser 70 may function as a rangefinder by providing a means for measuring the time lapse between the sending of the pulse and receiving the reflection from the target. This may be accomplished by a timing device such as an astable oscillator 80 which provides a series of pulses at a specified frequency to a counter 82. During ranging, the oscillator 80 is enabled immediately upon the pulsing of the laser 70. The astable oscillator 80 is then inhibited when the detector array 78 detects the reflection of the pulse from the acquired target. The number of pulses counted by the counter 82 (which is proportional to the lapse of time from transmission to detection of the received pulse) is supplied to the search computer 60 for computation of the distance to the acquired target.

It is noted that since the detector array 78 of the scanning mechanism 16 is used to detect the reflected pulse from the acquired target, the detector array 78 will be momentarily "blinded" upon reception of the reflected pulse. This is not a major concern because the loss of the thermal image will only exist for about one frame of the thermal image. Notwithstanding, if it is desirable to eliminate such momentary loss of the thermal image, the pulsing of the laser 70 may be synchronized with the scanning mechanism 16 such that the reflected pulse will be received by the detector array 78 only during the inactive portion of the scan pattern. This prevents the received pulse from interfering with the operation of the detector array 78 in imaging the thermal image. By way of example, when using the scanning mechanism described in my co-pending application, the laser 70 may be synchronized with the scanning mechanism 16 by utilizing the optical encoder 58 which senses the rotational position of the prisms 42 and 44 and correspondingly, the active and inactive portions of the scan pattern produced by the prisms 42 and 44. Specifically, the output of the optical encoder 58 is connected to the input of the search computer 60. With position information being supplied to the computer 60 by the optical encoder 58, the computer 60, is programmed to fire the laser 70 only at a time when the reflected pulse from an acquired target at maximum range will be received by the detector array 78 during the inactive portion of the scan pattern. The computer 60 may be further programmed to repeatedly range the target, the differing ranges of which can be utilized in conjunction with the direction cosines to compute the direction and velocity of the target.

Alternatively, or in combination with the pulse-typed laser 70, another laser may be positioned parallel with the axis of the steering mechanism and may comprise a relatively low powered continuous output laser whose laser beam is similarly boresighted with the scanning mechanism 16 on the acquired target. Such a low powered laser could function as a laser designator for beam rider devices.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. An imaging system, comprising in combination:
an imaging subsystem operable to scan object space within a predetermined field of view; and
a steering subsystem serially positioned in front of the input of said imaging subsystem, said steering subsystem being operable to scan object space within a variable field of regard within a field of search and including
a first prism,
a second prism positioned rearwardly of said first prism,
first means for rotating said first prism, and
second means for rotating said second prism,
whereby said field of view of said imaging subsystem is effectively increased to equal said variable field of regard within said field of search of said steering subsystem.

2. The imaging system as set forth in claim 1, wherein the surface of said first prism and the surface of said second prism of said steering subsystem are tilted with respect to the axis of the imaging system.

3. The imaging system as set forth in claim 1, wherein each said rotation means comprises a motor means.

4. The imaging system as set forth in claim 1, further comprising a first and second means for sensing the rotational position of said first prism and said second prism, respectively.

5. The imaging system as set forth in claim 1, further including a laser means whose output is transmitted through said prisms such that the output of said laser means remains boresighted with the imaging system.

6. The imaging system as set forth in claim 5, wherein said laser means comprises a pulsed-type laser means whose pulsed output is refracted through said prisms onto a target in space, the reflection of which is received by the imaging system.

7. The imaging system as set forth in claim 6, further including means for determining the lapse of time between the pulsing of said laser and the detection of the reflected pulsed output from the target by the imaging system and means for computing the distance to the target based upon said lapsed time.

8. The imaging system as set forth in claim 5, wherein said laser means comprises a continuous output laser operating as a laser designator for beam rider devices.

9. A steering mechanism for searching object space onto a thermal imaging system, comprising in combination:
a first prism;
a second prism positioned behind said first prism;
first means for rotating said first prism;
second means for rotating said second prism;
a first and second means for sensing the rotational position of said first prism and said second prism, respectively, each said means for sensing the rotational position of said prisms includes a timing disc connected to said prism and an optical encoder aligned with said disc for sensing the rotational position of said disc thereby sensing the rotational position of said prism,
whereby the object space is scanned onto the thermal imaging system by selectively rotating said prisms with respect to one another.

* * * * *